US008718854B2

(12) United States Patent
Hashimoto

(10) Patent No.: US 8,718,854 B2
(45) Date of Patent: May 6, 2014

(54) ELECTRICALLY-POWERED VEHICLE AND METHOD FOR CONTROLLING THE SAME

(75) Inventor: Toshiya Hashimoto, Miyoshi (JP)

(73) Assignee: Toyota Jidosha Kabushiki Kaisha, Toyota-Shi (JP)

(*) Notice: Subject to any disclaimer, the term of this patent is extended or adjusted under 35 U.S.C. 154(b) by 0 days.

(21) Appl. No.: 13/820,409

(22) PCT Filed: Sep. 3, 2010

(86) PCT No.: PCT/JP2010/065133
§ 371 (c)(1),
(2), (4) Date: Mar. 1, 2013

(87) PCT Pub. No.: WO2012/029170
PCT Pub. Date: Mar. 8, 2012

(65) Prior Publication Data
US 2013/0173108 A1 Jul. 4, 2013

(51) Int. Cl.
B60L 11/00 (2006.01)

(52) U.S. Cl.
USPC ............... 701/22; 701/54; 702/73; 903/930

(58) Field of Classification Search
USPC ........... 701/22, 112, 77, 54; 702/73; 180/265; 903/930
See application file for complete search history.

(56) References Cited

U.S. PATENT DOCUMENTS

| 7,877,184 | B2* | 1/2011 | Watanabe et al. | 701/54 |
| 2005/0247503 | A1* | 11/2005 | Imazu | 180/300 |
| 2006/0017414 | A1* | 1/2006 | Joe et al. | 318/432 |
| 2006/0224282 | A1* | 10/2006 | Seo et al. | 701/22 |
| 2008/0128208 | A1* | 6/2008 | Ideshio et al. | 184/6 |
| 2009/0030595 | A1* | 1/2009 | Sugai | 701/112 |
| 2009/0321157 | A1* | 12/2009 | Sowul et al. | 180/65.22 |
| 2010/0185351 | A1* | 7/2010 | Uchiyama et al. | 701/22 |
| 2010/0318249 | A1* | 12/2010 | Jinno et al. | 701/22 |

FOREIGN PATENT DOCUMENTS

| JP | 2006-136184 A | 5/2006 |
| JP | 2007-261477 A | 10/2007 |
| JP | 2009-033947 A | 2/2009 |

* cited by examiner

Primary Examiner — John R Olszewski
Assistant Examiner — Nicholas K Wiltey
(74) Attorney, Agent, or Firm — Kenyon & Kenyon LLP

(57) ABSTRACT

A hybrid vehicle includes a plurality of motor generators and an engine for generating a vehicle-driving force. A motor ECU controls the motor generators in accordance with respective torque command values for the motor generators. The motor ECU selects a motor generator used for performing vibration-reduction control, based on the operating state of the motor generators each. The output torque of the motor generator used for the vibration-reduction control is controlled so that a compensation torque corresponding to a periodic vibration-reduction torque component for cancelling out a periodic variation component of the rotational speed of drive wheels is superimposed on the torque for generating the vehicle-driving force.

13 Claims, 9 Drawing Sheets

| CONTROL MODE | I. SINE-WAVE PWM | II. OVERMODULATION PWM | III. RECTANGULAR WAVE (ONE PULSE) |
|---|---|---|---|
| INVERTER'S OUTPUT VOLTAGE WAVEFORM | FUNDAMENTAL WAVE COMPONENT | FUNDAMENTAL WAVE COMPONENT | FUNDAMENTAL WAVE COMPONENT |
| MODULATION RATIO | 0~0.61 | 0.61~0.78 | 0.78 |
| FEATURE | SMALL TORQUE VARIATION | IMPROVED OUTPUT IN MIDDLE-SPEED RANGE | IMPROVED OUTPUT IN HIGH-SPEED RANGE |

ELECTRICALLY-POWERED VEHICLE AND METHOD FOR CONTROLLING THE SAME

This is a 371 national phase application of PCT/JP2010/065133 filed 3 Sep. 2010, the contents of which are incorporated herein by reference.

FIELD OF THE INVENTION

The present invention relates to an electrically-powered vehicle and a method for controlling the electrically-powered vehicle, and more specifically to motor control for reducing vibrations of the vehicle.

BACKGROUND OF THE INVENTION

In recent years, electrically-powered vehicles mounted with an electric motor for driving the vehicle, such as hybrid vehicle, electric vehicle, fuel cell vehicle and the like have been of interest as environmentally-friendly vehicles. In the electrically-powered vehicle, when an output of the vehicle-driving electric motor is used to drive the drive wheels, a periodically varying component may occur to the rotational speed of the electric motor to thereby cause vibrations of the vehicle. Such a phenomenon, for example, can occur when the vehicle accelerates or decelerates.

Japanese Patent Laying-Open No. 2006-136184 (PTL 1) discloses motor control for reducing such vehicle's vibrations. Specifically, the periodically varying component of the rotational speed of the vehicle-driving electric motor is extracted and a vibration-reduction torque of the opposite phase relative to the extracted variation component is added to a torque command value to thereby implement the aforementioned control for reducing vibrations. It should be noted that PTL 1 discloses that this vibration-reduction control is performed only when pulse width modulation (PWM) control (particularly sine wave PWM control) which provides a quick control responsiveness is applied.

As for the hybrid vehicle mounted with an engine in addition to the vehicle-driving electric motor, the engine may be operated intermittently depending on the state of the vehicle. When the engine is started or stopped while being intermittently operated, speed variations of the vehicle can cause vehicle's vibrations. Japanese Patent Laying-Open No. 2009-33947 (PTL 2) discloses that a hybrid vehicle undergoes the vibration-reduction control which is performed when its engine is started/stopped. According to PTL 2, the magnitude of the torque of the electric motor is changed so that it is appropriate for the engine's cycle such as expansion stroke—compression stroke for example, to thereby implement the vibration-reduction control for alleviating mechanical vibrations of the engine. PTL 2 also discloses that the vibration-reduction control is performed only when the PWM control (sine wave PWM control) is applied.

Technical Problem

It is seen from the foregoing that, according to PTL 1 and PTL 2, the vibration-reduction control by means of control of the torque of the vehicle-driving electric motor is performed only when the PWM control (sine wave PWM control) is applied. Therefore, if the PWM control is not applied while the vibration-reduction control is required, the DC voltage to be converted by an inverter is boosted by a voltage boost converter. Accordingly, the modulation factor is reduced to enable the PWM control to be applied, and in turn enable the vibration-reduction control to be performed.

As for the vibration-reduction control of PTL 1 and PTL 2, however, depending on the operating state of the vehicle-driving electric motor, the control mode cannot be set to the PWM control. As a result, the vibration-reduction control cannot be performed and the vehicle's vibrations may not be reduced in some cases. In addition, the boosted DC voltage causes an increase of the switching loss of the voltage boost converter, which results in a concern about a reduction of the energy efficiency (namely fuel efficiency) of the vehicle as a whole.

In view of the above, it is difficult for an electrically-powered vehicle mounted with a plurality of vehicle-driving electric motors to sufficiently enjoy the effect of the vibration-reduction control disclosed in PTL 1 and PTL 2 if this control is merely applied as it is.

The present invention has been made to solve the problem as described above, and an object of the present invention is to appropriately and smoothly perform in order to thereby improve the driving comfort, on an electrically-powered vehicle mounted with a plurality of vehicle-driving electric motors, the vibration-reduction control for reducing vehicle's vibrations by means of control of the torque of the electric motors.

Solution To Problem

According to an aspect of the present invention, an electrically-powered vehicle includes: a plurality of electric motors for generating a vehicle-driving force; and a control device for controlling the plurality of electric motors. The control device is configured to perform vibration-reduction control by: selecting, from the plurality of electric motors, an electric motor for use in performing the vibration-reduction control, depending on an operating state of the plurality of electric motors each; and adding to an output torque of the selected electric motor, a periodic compensation torque for cancelling out a periodic speed variation component of the vehicle.

Preferably, the operating state includes a control mode for the electric motors each, and the control mode includes a first control mode to which pulse width modulation control is applied and a second control mode to which rectangular-wave voltage control is applied. The control device performs the vibration-reduction control by selecting from the plurality of electric motors an electric motor to which the first control mode is applied.

Still preferably, the operating state includes at least one of a temperature, a rotational speed, a torque, and an output of the electric motors each. The control device inhibits the vibration-reduction control which uses an electric motor where the at least one of the temperature, the rotational speed, the torque, and the output is higher than a predetermined value, among the plurality of electric motors.

Preferably, the electrically-powered vehicle further includes an internal combustion engine. The plurality of electric motors include: a first electric motor disposed on a power transmission path extending from the internal combustion engine to a drive wheel through a drive shaft; and a second electric motor mechanically connected to the drive shaft. The control device performs the vibration-reduction control using the second electric motor when the operating state of the second electric motor is a state that allows the vibration-reduction control to be performed, and performs the vibration-reduction control using the first electric motor when the operating state of the second electric motor is not the state that allows the vibration-reduction control to be performed.

More preferably, the operating state includes a control mode for the electric motors each, and the control mode includes a first control mode to which pulse width modulation control is applied and a second control mode to which rectangular-wave voltage control is applied. When the first control mode is applied to the second electric motor, the control device performs the vibration-reduction control using the second electric motor and, when the first control mode is applied to none of the first and second electric motors, the control device causes a decrease of an output of the second electric motor and causes an increase of an output of at least one of the internal combustion engine and the first electric motor, so that the increase corresponds to an amount of the decrease.

Still more preferably, the electrically-powered vehicle further includes a differential device including first to third rotational elements capable of rotating relative to each other. The first rotational element is mechanically connected to an output shaft of the internal combustion engine, the second rotational element is mechanically connected to an output shaft of the first electric motor, and the third rotational element is mechanically connected to the drive shaft and an output shaft of the second electric motor.

Preferably, the plurality of electric motors include: a first electric motor for generating a driving force for a sub drive wheel; and a second electric motor for generating a driving force for a main drive wheel. When the operating state of the second electric motor is a state that allows the vibration-reduction control to be performed, the control device performs the vibration-reduction control using the second electric motor and, when the operating state of the second electric motor is not the state that allows the vibration-reduction control to be performed, the control device performs the vibration-reduction control using the first electric motor.

More preferably, when the control device performs the vibration-reduction control, the control device calculates a vibration-reduction torque component of a phase opposite to the periodic speed variation component and adds a compensation torque corresponding to the vibration-reduction torque component, to an output torque of the electric motor used in performing the vibration-reduction control. The compensation torque when the vibration-reduction control is performed using the first electric motor and the compensation torque when the vibration-reduction control is performed using the second electric motor differ from each other in terms of phase relative to the vibration-reduction torque component.

According to another aspect of the present invention, there is provided a method for controlling an electrically-powered vehicle including a plurality of electric motors for generating a vehicle-driving force. The method includes the steps of: calculating a periodic vibration-reduction torque component for cancelling out a periodic speed variation component of the vehicle; selecting, from the plurality of electric motors, an electric motor for use in performing vibration-reduction control, depending on an operating state of the plurality of electric motors each; and adding to an output torque of the electric motor for use in performing the vibration-reduction control, a compensation torque corresponding to the vibration-reduction torque component.

Preferably, the operating state includes a control mode for the electric motors each, and the control mode includes a first control mode to which pulse width modulation control is applied and a second control mode to which rectangular-wave voltage control is applied. The step of selecting performs the vibration-reduction control using, among the plurality of electric motors, an electric motor to which the first control mode is applied.

Still preferably, the operating state includes at least one of a temperature, a rotational speed, a torque, and an output of the electric motors each. The step of selecting inhibits the vibration-reduction control which uses an electric motor where the at least one of the temperature, the rotational speed, the torque, and the output is higher than a predetermined value, among the plurality of electric motors.

Preferably, the electrically-powered vehicle further includes an internal combustion engine. The plurality of electric motors include: a first electric motor disposed on a power transmission path extending from the internal combustion engine to a drive wheel through a drive shaft; and a second electric motor mechanically connected to the drive shaft. The step of selecting performs the vibration-reduction control using the second electric motor when the operating state of the second electric motor is a state that allows the vibration-reduction control to be performed, and performs the vibration-reduction control using the first electric motor when the operating state of the second electric motor is not the state that allows the vibration-reduction control to be performed.

More preferably, the operating state includes a control mode for the electric motors each, and the control mode includes a first control mode to which pulse width modulation control is applied and a second control mode to which rectangular-wave voltage control is applied. The step of selecting includes the steps of: performing the vibration-reduction control using the second electric motor when the first control mode is applied to the second electric motor; and performing the vibration-reduction control using the first electric motor when the first control mode is not applied to the second electric motor and the first control mode is applied to the first electric motor. The method for controlling an electrically-powered vehicle further includes the step of causing a decrease of an output of the second electric motor and causing an increase of an output of at least one of the internal combustion engine and the first electric motor, so that the increase corresponds to an amount of the decrease, when the first control mode is applied to none of the first and second electric motors.

Preferably, the plurality of electric motors include: a first electric motor for generating a driving force for a sub drive wheel; and a second electric motor for generating a driving force for a main drive wheel. The step of selecting performs the vibration-reduction control using the second electric motor when the operating state of the second electric motor is a state that allows the vibration-reduction control to be performed, and performs the vibration-reduction control using the first electric motor when the operating state of the second electric motor is not the state that allows the vibration-reduction control to be performed.

More preferably, the compensation torque when the vibration-reduction control is performed using the first electric motor and the compensation torque when the vibration-reduction control is performed using the second electric motor differ from each other in terms of phase relative to the vibration-reduction torque component.

Advantageous Effects of Invention

In accordance with the present invention, for an electrically-powered vehicle mounted with a plurality of motor-driving electric motors, the vibration-reduction control for reducing vibrations of the vehicle by means of control of the torque of the electric motors can be performed appropriately and smoothly to thereby improve the driving comfort.

DETAILED DESCRIPTION

Figure 1:
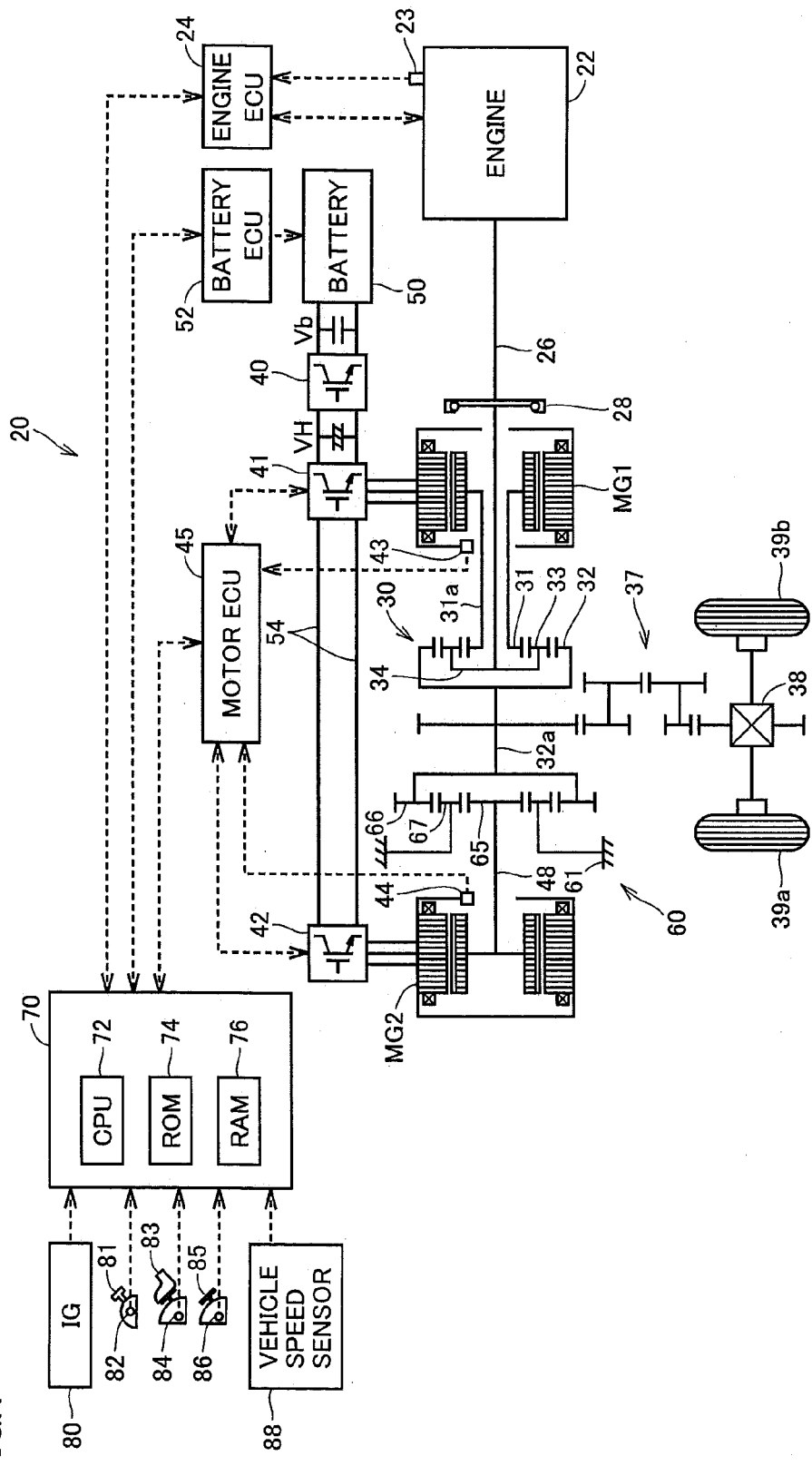
FIG. 1 is a configuration diagram showing a schematic configuration of a hybrid vehicle illustrated as a typical example of the electrically-powered vehicle in an embodiment of the present invention.

In the following, embodiments of the present invention will be described in detail with reference to the drawings. In the drawings, the same or corresponding components are denoted by the same reference characters, and a description thereof will not be repeated in principle.

System Configuration

FIG. 1 is a configuration diagram showing a schematic configuration of a hybrid vehicle illustrated as a typical example of the electrically-powered vehicle in an embodiment of the present invention.

Referring to FIG. 1, hybrid vehicle 20 in a first embodiment includes an engine 22, a crankshaft 26 serving as an output shaft of engine 22, a torsional damper 28, and a three-shaft power split device 30. Crankshaft 26 is connected through torsional damper 28 to power split device 30.

Hybrid vehicle 20 further includes motor generators MG1, MG2 serving as electric motors for driving the vehicle, a transmission 60, and a hybrid-adapted electronic control unit (hereinafter also referred to as "HVECU") 70 controlling the whole drive system of hybrid vehicle 20. Motor generator MG2 is connected through transmission 60 to power split device 30. Motor generators MG1, MG2 correspond respectively to "first electric motor" and "second electric motor." Motor generators MG1, MG2 are each capable of outputting both a positive torque and a negative torque, and each can be driven as an electric motor and can also be driven as an electric generator.

Engine 22 is an "internal combustion engine" that outputs power generated from a hydrocarbon-based fuel such as gasoline or light oil. An engine-adapted electronic control unit (hereinafter also referred to as "engine ECU") 24 receives signals that are input from various sensors that detect the operating state of engine 22, such as crank angle of crankshaft 26 that is input from a crank angle sensor 23. Engine ECU 24 communicates with HVECU 70 and receives from HVECU 70 a control command for engine 22. Engine ECU 24 performs engine control such as fuel injection control and ignition control as well as intake-air-quantity control for engine 22 depending on the operating state of engine 22 and based on signals from various sensors, so that engine 22 is operated in accordance with the control command from HVECU 70. Further, engine ECU 24 outputs data concerning the operating state of engine 22 to HVECU 70 as required.

Power split device 30 includes an external-tooth sun gear 31, an internal-tooth ring gear 32 placed concentrically with this sun gear 31, a plurality of pinion gears 33 meshing with sun gear 31 and also meshing with ring gear 32, and a carrier 34. Carrier 34 is configured to hold a plurality of pinion gears 33 in such a manner that allows each pinion gear to rotate about its axis and to revolve. Power split device 30 is configured in the form of a planetary gear train performing the differential function using sun gear 31, ring gear 32, and carrier 34 as rotational elements.

To carrier 34, crankshaft 26 of engine 22 is connected. To sun gear 31, the output shaft of motor generator MG1 is connected through a sun gear shaft 31a. A ring gear shaft 32a serving as "drive shaft" is rotated as ring gear 32 is rotated. To ring gear shaft 32a, the output shaft of motor generator MG2 is connected through transmission 60. In the following, ring gear shaft 32a will also be referred to as drive shaft 32a.

Drive shaft 32a is mechanically connected to drive wheels 39a, 39b through a gear mechanism 37 and a differential gear 38. Thus, the power that is output by power split device 30 to ring gear 32, namely drive shaft 32a, is output to drive wheels 39a, 39b through gear mechanism 37 and differential gear 38.

Thus, power split device 30 corresponds to "differential device." In addition, carrier 34 corresponds to "first rotational element," sun gear 31 corresponds to "second rotational element," and ring gear 32 corresponds to "third rotational element."

Transmission 60 is configured to provide a predetermined reduction gear ratio between an output shaft 48 of motor generator MG2 and drive shaft 32a. Transmission 60 is typically constituted of a planetary gear train. Transmission 60 includes an external-tooth sun gear 65, an internal-tooth ring gear 66 placed concentrically with this sun gear 65, and a plurality of pinion gears 67 meshing with sun gear 65 and also meshing with ring gear 66. Since the planetary carrier is fixed to a case 61, a plurality of pinion gears 67 each only rotate about its axis without making revolutions. Namely, the ratio of the number of revolutions between sun gear 65 and ring gear 66 (reduction gear ratio) is fixed.

It should be noted that the configuration of transmission 60 is not limited to the example in FIG. 1. In addition, the output shaft of motor generator MG2 and ring gear shaft (drive shaft) 32a may be connected to each other without transmission 60 interposed therebetween.

When motor generator MG1 functions as an electric generator, the power from engine 22 that is input from carrier 34 is distributed between sun gear 31 side and ring gear 32 side depending on the gear ratio therebetween. In contrast, when motor generator MG1 functions as an electric motor, the power from engine 22 that is input from carrier 34 and the power from motor generator MG1 that is input from sun gear 31 are integrated to be output to ring gear 32.

Motor generators MG1, MG2 are each typically constituted of a three-phase permanent-magnet synchronous motor. Motor generators MG1, MG2 provide and receive electric power through a converter 40 and inverters 41, 42 to and from a battery 50. Inverters 41, 42 are each constituted of a common three-phase inverter having a plurality of switching devices.

Converter 40 performs bidirectional DC voltage conversion between voltage VH on an electric power line 54 and voltage Vb of battery 50. Converter 40 is constituted for example of a bidirectional-current-type boost chopper circuit. The duty of the switching device (not shown) of the boost chopper circuit is controlled so that voltage VH on electric power line 54 agrees with voltage command value VHr. Inverters 41, 42 apply to motor generators MG1, MG2 a pseudo AC voltage made up of a collection of voltage pulses generated by switching DC voltage VH through ON and OFF of the switching devices.

Electric power line 54 which electrically connects converter 40 and inverters 41, 42 is configured in the form of a positive bus and a negative bus shared by inverters 41, 42. Therefore, the electric power generated by one of motor generators MG1, MG2 can be consumed by the other motor. Accordingly, battery 50 is charged with the electric power generated by one of motor generators MG1, MG2 or discharges electric power corresponding to shortage of electric power to motor generator MG1 or MG2. If the balance of electric power is kept by motor generators MG1, MG2, battery 50 is not charged/discharged.

Drive of motor generators MG1, MG2 both is controlled by a motor-adapted electronic control unit (hereinafter also referred to as "motor ECU") 45. To motor ECU 45, signals necessary for controlling drive of motor generators MG1, MG2 are input. For example, signals such as signals from rotational position detection sensors 43, 44 detecting the rotational position of the rotor of motor generators MG1, MG2 and a phase current applied to motor generators MG1, MG2 that is detected by a current sensor (not shown) are input to motor ECU 45. Based on the signals from rotational position detection sensors 43, 44, respective rotational speeds of motor generators MG1, MG2 can be detected.

Motor ECU 45 communicates with HVECU 70 and, in accordance with an operation command from HVECU 70, motor ECU 45 controls drive of motor generators MG1, MG2. Specifically, motor ECU 45 outputs a switching control signal to inverters 41, 42 so that respective output torques of motor generators MG1 and MG2 agree with torque command values Trqcom(1) and Trqcom(2). For example, motor ECU 45 calculates, based on a difference between a current command value which is set in accordance with torque command values Trqcom(1), Trqcom(2), and the detected value of current of motor generators MG1, MG2, an output voltage command (AC voltage) for inverters 41, 42. Then, a switching control signal for inverters 41, 42 is generated in accordance for example with pulse width modulation control, so that the pseudo AC voltage that is output from inverters 41, 42 becomes close to a corresponding output voltage command. Further, motor ECU 45 outputs to HVECU 70 data concerning the operating state of motor generators MG1, MG2 as required. Regarding drive of motor generators MG1, MG2 by motor ECU 45, further details will be described later herein.

Battery 50 is managed by a battery-adapted electronic control unit (hereinafter also referred to as "battery ECU") 52. To battery ECU 52, signals that are necessary for managing battery 50 are input. For example, signals such as the terminal-to-terminal voltage from a voltage sensor (not shown) disposed between the terminals of battery 50, the charge/discharge current of battery 50 from a current sensor (not shown), and the battery temperature from a temperature sensor (not shown) attached to battery 50 are input to battery ECU 52. Battery ECU 52 outputs data concerning the state of battery 50 by means of communication to HVECU 70, as required. Here, in order to manage battery 50, battery ECU 52 also calculates the remaining capacity (SOC: State of Charge) based on the integral of the charge/discharge current detected by the current sensor.

HVECU 70 is configured to serve as a microprocessor having a CPU (Central Processing Unit) 72 as a main component. HVECU 70 includes CPU 72, a ROM (Read Only Memory) 74 storing process program, map, and the like, a RAM (Random Access Memory) 76 temporarily storing data, as well as an input/output port and a communication port (not shown). To HVECU 70, signals are input through the input port, such as an ignition signal from an ignition switch 80, shift position SP from a shift position sensor 82 detecting the operating position of a shift lever 81, accelerator pedal position Acc from an accelerator pedal position sensor 84 detecting the pedal position of accelerator pedal 83, brake pedal position BP from a brake pedal position sensor 86 detecting the pedal position of brake pedal 85, and vehicle speed V from a vehicle speed sensor 88.

Further, HVECU 70 is connected through the communication port to engine ECU 24, motor ECU 45, and battery ECU 52 as described above. Thus, HVECU 70 communicates various control signals and data with other ECUs. Here, engine ECU 24, motor ECU 45, and battery ECU 52 can also be configured in the form of a microprocessor, like HVECU 70. Further, while FIG. 1 shows HVECU 70, engine ECU 24, motor ECU 45, and battery ECU 52 as separate ECUs, an ECU into which these functions are partially or entirely incorporated can also be arranged. Alternatively, ECUs may be arranged in such a manner that the functions of each ECU are provided by separate ECUs.

In hybrid vehicle 20 configured in the above-described manner, HVECU 70 calculates a required torque to be output to drive shaft 32a, based on vehicle speed V and accelerator pedal position Acc corresponding to the pedal position of accelerator pedal 83 depressed by the driver. In order that required power corresponding to this required torque may be output to drive shaft 32a, engine 22 and motor generators MG1, MG2 are controlled in accordance with any of the operating modes as described below. Namely, motor generators MG1, MG2 are each configured to generate a vehicle-driving force.

In the case of the EV (Electric Vehicle) operating mode, the operation of engine 22 is stopped and motor generators MG1, MG2 are controlled so that the power which meets the required power is output from motor generator MG2 to drive shaft 32a.

In the case of the HV (Hybrid Vehicle) operating mode, engine 22 is operated and hybrid vehicle 20 travels using the power from engine 22 and the power from motor generators MG1, MG2. For example, the operation of engine 22 is controlled so that the power that meets the sum of the required power and the electric power which is necessary for charging/discharging battery 50 is output from engine 22. Further, the output torque of motor generators MG1, MG2 is controlled so that the whole or a part of the power that is output from engine 22 which involves charging/discharging of battery 50 is converted by power split device 30 and motor generators MG1, MG2 into a torque and thus the required power is output to drive shaft 32a.

Alternatively, the operation of engine 22 is controlled so that the power which meets the required power is output from engine 22 and motor generators MG1, MG2 are controlled so that the whole of the power which is output from engine 22 is converted by power split device 30 and motor generators MG1, MG2 into a torque and output to drive shaft 32a.

Thus, a torque which should be output by motor generators MG1, MG2 for generating a required vehicle-driving force is successively calculated based on, for example, the state of the vehicle and the operation by the driver. In accordance with a torque command value which is set based on the calculated torque, the output torque of motor generators MG1, MG2 is controlled.

Figure 2:
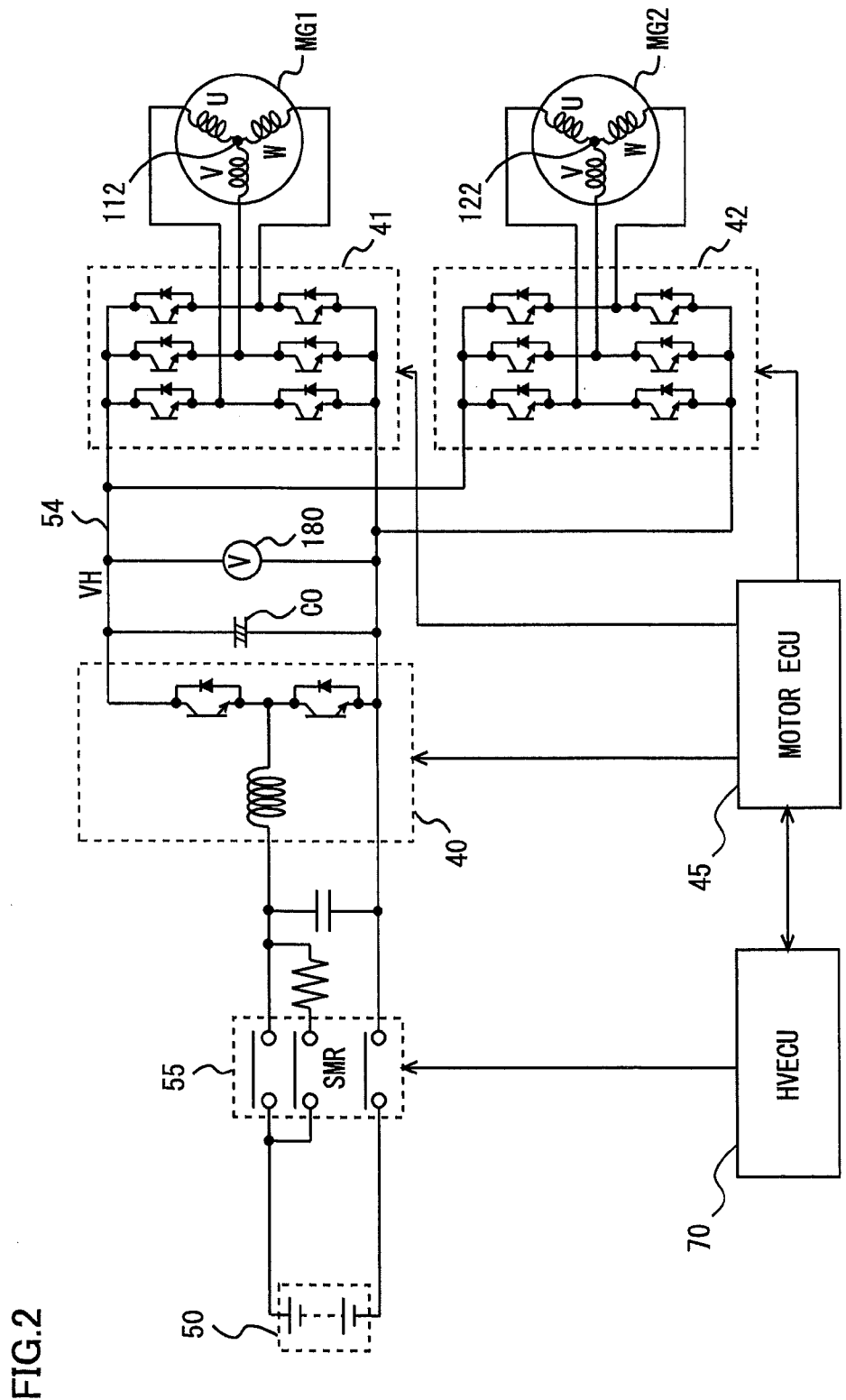
FIG. 2 is a circuit diagram of an electrical system for controlling drive of motor generators shown in FIG. 1.

FIG. 2 is a circuit diagram of an electrical system for controlling drive of motor generators MG1, MG2 shown in FIG. 1.

Referring to FIG. 2, the electrical system of hybrid vehicle 20 includes battery 50, an SMR (System Main Relay) 55, converter 40, and inverters 41, 42.

SMR 55 is provided between battery 50 and converter 40. When SMR 55 is the OFF state, battery 50 is disconnected from the electrical system. When SMR 55 is the ON state, battery 50 is connected to the electrical system. SMR 55 is made ON or OFF in response to a control signal from HVECU 70. For example, with ignition switch 800N, a user's operation performed to start driving instructs the electrical system to start up. In response to the instruction to start up the electrical system, HVECU 70 renders SMR 55 ON.

Converter 40 has a configuration of a common boost chopper circuit constituted of a reactor and two power semiconductor switching devices (hereinafter also referred to simply as switching devices). As the power semiconductor switching devices, devices such as bipolar transistors, power MOSFETs (Metal Oxide Semiconductor Field-Effect Transistors), or IGBTs (Insulated Gate Bipolar Transistors) may be used. To each switching device, an antiparallel diode is connected.

Inverter 41 connected to motor generator MG1 includes a U phase arm, a V phase arm, and a W phase arm. The U phase arm, V phase arm, and W phase arm are connected in parallel. The U, V, and W phase arms each have two switching devices connected in series. For each switching device, an antiparallel diode is provided.

The coils of respective phases (U, V, W) wound around a stator (not shown) of motor generator MG1 are connected to each other at a neutral point 112. The point of connection between the switching devices of each phase arm in inverter 41 is connected to the end of the corresponding phase coil in motor generator MG1.

Inverter 42 has, like inverter 41, the configuration of a common three-phase inverter. The coils of respective phases (U, V, W) wound around a stator (not shown) of motor generator MG2 are connected to each other at a neutral point 122. The point of connection between the switching devices of each phase arm in inverter 42 is connected to the end of the corresponding phase coil in motor generator MG2.

When the electric power discharged from battery 50 is to be supplied to motor generator MG1 or MG2, the voltage is boosted by converter 40. On the contrary, when the electric power generated by motor generator MG1 or MG2 is to be supplied to charge battery 50, the voltage is reduced by converter 40.

System voltage VH which is a DC voltage on electric power line 54 between converter 40 and inverters 41 and 42 is detected by a voltage sensor 180. The result of detection by voltage sensor 180 is transmitted to motor ECU 45.

Inverter 41 converts the DC voltage on electric power line 54 into AC power to supply the AC power to motor generator MG1. Inverter 41 also converts to DC power the AC power generated through regenerative power generation by motor generator MG1. Likewise, inverter 42 converts the DC voltage on electric power line 54 into AC power to supply the AC power to motor generator MG2. Inverter 42 also converts to DC power the AC power generated through regenerative power generation by motor generator MG2.

As to Basic Motor Control

As seen from the foregoing, motor generators MG1, MG2 are controlled through DC-AC power conversion by inverters 41, 42 so that motor generators MG1, MG2 output a torque in accordance with a torque command value. Under this motor control, a control mode is selected depending on the state of relevant motor generator MG1 or MG2.

Figures 3, 4:
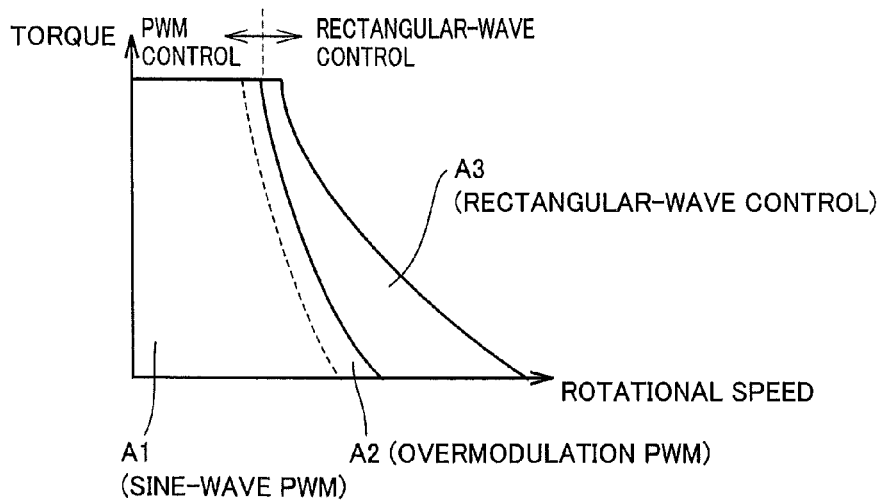
FIG. 3 is a schematic diagram for explaining selection of a control mode for the motor generators shown in FIG. 1.
FIG. 4 is a schematic diagram generally showing a relationship between an operating range of a motor generator and selection of a control mode.

Referring to FIG. 3, one of PWM control and rectangular-wave voltage control is selected as the control mode. Depending on the operating state of motor generators MG1, MG2 each, one of the PWM control and the rectangular-wave voltage control is selectively applied.

The sine-wave PWM control is used as common PWM control, under which ON/OFF of the switching devices of each phase arm in the inverter (not shown) is controlled in accordance with a voltage comparison between a sine-wave voltage command value and a carrier wave (typically triangular wave). Consequently, for the collection of the high-level periods corresponding to the ON periods of the upper-arm devices and the low-level periods corresponding to the ON periods of the lower-arm devices, the duty ratio is controlled so that the fundamental wave component is sine wave in a certain period of time.

It is well known that the sine-wave PWM control can increase this fundamental wave component (effective value) to only approximately 0.61 times as high as the inverter's input voltage. In the following, the ratio of the fundamental wave component (effective value) of the voltage (line voltage) applied to motor generators MG1, MG2, to the DC link voltage (DC voltage VH) of inverters 41, 42 will be referred to as "modulation ratio."

Therefore, basically the control mode is selected depending on the modulation ratio. Generally, when the modulation ratio corresponding to a voltage command (sine-wave voltage) calculated under feedback control in accordance with a torque command value is lower than 0.61, the sine-wave PWM control is selected. In contrast, when the modulation ratio is higher than 0.61, the sine-wave PWM control cannot be applied.

As for the rectangular-wave voltage control, one pulse of the rectangular wave in which the ratio between the high-level period and the low-level period in the above-described certain period is 1:1 is applied to motor generators MG1, MG2. Accordingly, the modulation ratio is increased to 0.78. Regarding the rectangular-wave voltage control, the amplitude of the voltage applied to the motors is fixed. Thus, control of the torque is executed through control of the phase of the rectangular-wave voltage pulse based on a difference between the actual torque value and the torque command value.

It should be noted that, regarding the rectangular-wave voltage control, the amplitude of the AC voltage applied from inverters 41, 42 to motor generators MG1, MG2 is fixed and the control of the torque is executed based on the voltage phase only. Therefore, regarding the rectangular-wave voltage control, the torque control responsiveness is lower than that of the PWM control (particularly sine-wave PWM control).

When the modulation ratio is in a range to which the sine-wave PWM control cannot be applied, the rectangular-wave voltage control is selected. When the modulation ratio is in a range of 0.61 to 0.78, overmodulation PWM control may also be applied.

Under the overmodulation PWM control, PWM control similar to the above-described sine-wave PWM control is performed with the amplitude of the voltage command larger than the amplitude of the carrier wave. In particular, the voltage command can be distorted relative to the original sine-wave waveform to thereby increase the fundamental wave component and increase the modulation ratio to a range from the highest modulation ratio of the sine-wave PWM control to 0.78. It should be noted that, regarding the overmodulation PWM control, the distortion of the voltage command makes it more likely that a high-frequency component occurs to the electric current component as well. Therefore, in order to ensure the control stability, it is difficult to enhance the control responsiveness to the level equivalent to the sine-wave PWM control. This is because addition of a low-pass filter or increase of the time constant, for example, becomes necessary.

In motor generators MG1, MG2, the induced voltage increases as the rotational speed or the output torque increases and accordingly the required drive voltage (required motor voltage) increases. DC voltage VH controlled by converter 40 has to be set higher than this required motor voltage. Meanwhile, the voltage boosted by converter 40, namely DC voltage VH has a limit value. Due to this, when the output is in a high-output range and the modulation ratio is higher than 0.61, the sine-wave PWM control cannot be selected.

As also disclosed in PTL 1 and PTL 2, in the configuration having converter 40, an increase of system voltage VH causes a decrease of the modulation ratio if the voltage command remains the same, and therefore, the area to which the PWM control can be applied increases. It should be noted that the increase of system voltage VH also causes an increase of the voltage boost ratio in converter 40, resulting in an increased loss of the switching devices and a tendency to decrease the efficiency.

Since torque command values for motor generators MG1, MG2 are set separately from each other, one of the PWM control and the rectangular-wave voltage control is selected for each of motor generators MG1, MG2 depending on the operating state of motor generators MG1, MG2 each at that time. When the overmodulation PWM control is applicable in addition to the sine-wave PWM control as the PWM control, the overmodulation PWM control is applied instead of the sine-wave PWM control when the modulation ratio falls in a range of 0.61 to 0.78. When the modulation ratio is higher than 0.78, the rectangular-wave voltage control is applied. The overmodulation PWM control and the rectangular-wave voltage control are applied to achieve an improved output of motor generators MG1, MG2.

FIG. 4 schematically shows the correspondence between the operating range of motor generators MG1, MG2 and selection of the control mode.

Referring to FIG. 4, generally the sine-wave PWM control is used for a low-speed range A1 for reducing the torque variation, since the modulation ratio is not relatively high. For the operating range where the output is larger to which the sine-wave PWM control cannot be applied, generally the overmodulation PWM control is applied for a middle-speed range A2, and the rectangular-wave voltage control is applied for a high-speed range A3.

As to Vibration-Reduction Control

In the following, vibration-reduction control for the electrically-powered vehicle in the embodiment of the present invention will be described.

Figure 5:
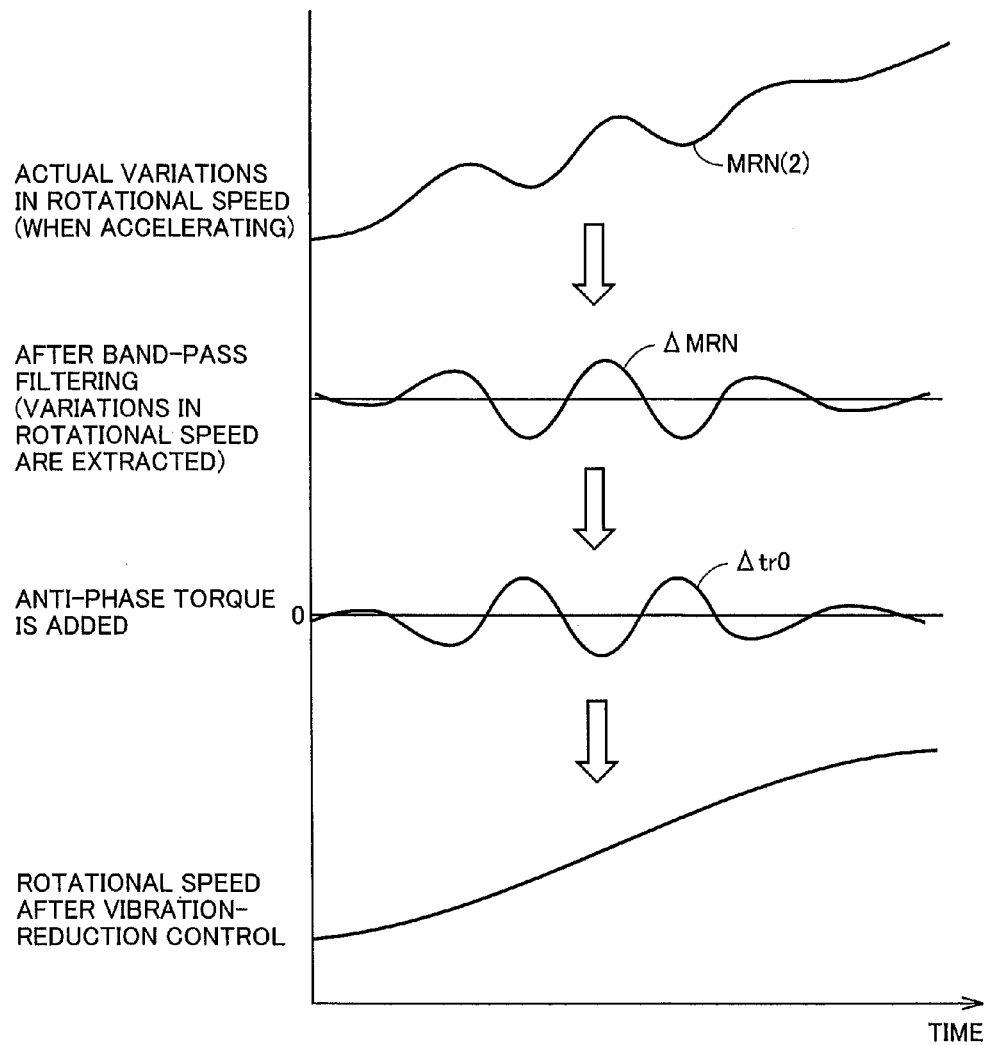
FIG. 5 is a waveform chart for explaining an example of vibration-reduction control.

FIG. 5 is a waveform chart showing an example of the vibration-reduction control. Under the vibration-reduction control shown in FIG. 5, in order to reduce variations of the vehicle speed which are a cause of variations of the vehicle's longitudinal acceleration which in turn cause vehicle's vibrations, variations of the rotational speed of motor generator MG2 which is mechanically connected to drive shaft 32a are reduced.

Referring to FIG. 5, while the vehicle is accelerating for example, rotational speed MRN(2) of motor generator MG2 is also increasing. At the time of such acceleration, the actual rotational speed MRN(2) does not necessarily exhibit a monotonic increase but exhibits an undulating increase. This undulating component causes variations in longitudinal acceleration of the vehicle and thereby causes the vehicle to vibrate, which results in a concern about deterioration of the vehicle driving comfort.

Under the vibration-reduction control, the undulating component of rotational speed MRN(2) (hereinafter this component will also be referred to as variation component ΔMRN(2)) is extracted from the detected rotational speed MRN(2). Further, based on the anti-phase component of the extracted variation component ΔMRN(2), a vibration-reduction torque Δtr0 is calculated. Namely, vibration-reduction torque Δtr0 is a periodic torque component for cancelling out the periodic variation component ΔMRN(2).

Then, torque control can be performed so that a torque component (hereinafter also referred to as compensation torque) corresponding to the aforementioned vibration-reduction torque Δtr0 is superimposed on the output torque of motor generator MG2, to thereby remove the variation component from the rotational speed MRN(2). Namely, the vibration-reduction control for reducing vehicle's vibrations can be executed.

Figure 6:
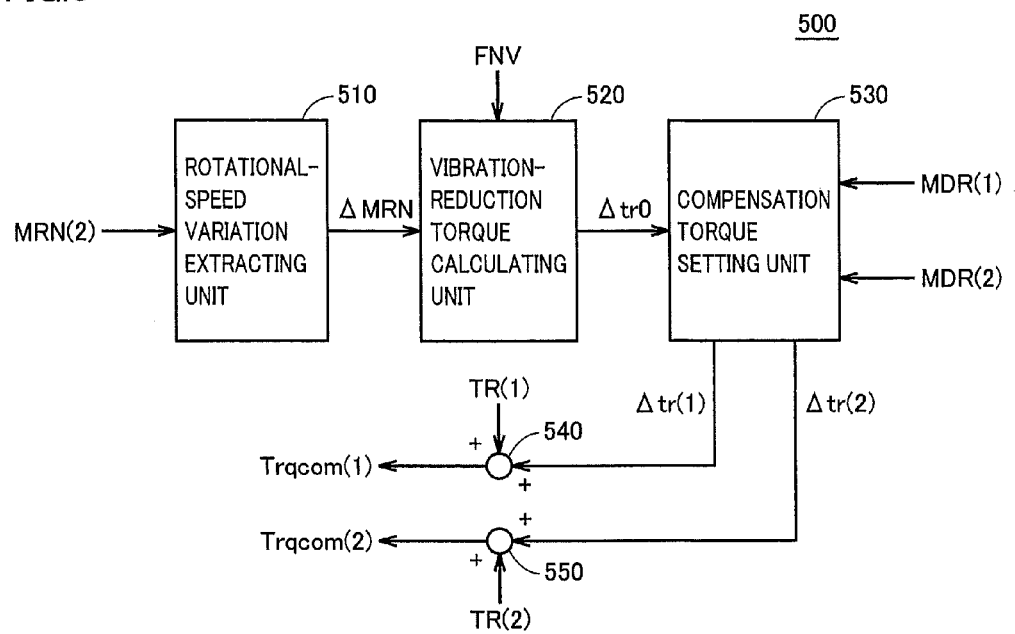
FIG. 6 is a functional block diagram for explaining the vibration-reduction control for the electrically-powered vehicle in an embodiment of the present invention.

FIG. 6 is a functional block diagram for explaining the vibration-reduction control for the electrically-powered vehicle in the embodiment of the present invention.

Each functional block shown in FIG. 6 may be implemented through execution of a predetermined program by an ECU (preferably motor ECU 45) (software processing) or through an operation of an electronic circuit configured in the ECU (hardware processing).

Referring to FIG. 6, a vibration-reduction control unit 500 includes a rotational-speed variation extracting unit 510, a vibration-reduction torque calculating unit 520, a compensation torque setting unit 530, and addition units 540, 550.

Rotational-speed variation extracting unit 510 extracts periodic speed variation component ΔMRN from the detected value of rotational speed MRN(2) of motor generator MG2 corresponding to the rotational speed of drive wheels 39a, 39b, in order to detect vehicle's speed variations. Speed variation component ΔMRN corresponds to variation component ΔMRN(2) in FIG. 5. Rotational-speed variation extracting unit 510 may be configured for example by a band-pass filter.

Vibration-reduction torque calculating unit 520 calculates vibration-reduction torque Δtr0 for cancelling out speed variation component ΔMRN when the vibration-reduction control is required. As shown in FIG. 5, vibration-reduction torque Δtr0 is a periodic torque component opposite in phase to speed variation component ΔMRN.

A vibration-reduction control flag FNV is set ON when the vibration-reduction control is required and is made OFF otherwise. The vibration-reduction control is effected under situations where the vehicle's vibrations are likely to occur, such as the situation where the vehicle is accelerated or decelerated or engine 22 is started or stopped, for example. In contrast, in the situations where the vehicle is steadily running or stopped without being loaded, a slight variation of the output torque results in a behavior of the vehicle. Therefore, the addition of vibration-reduction torque Δtr0 may disadvantageously cause vehicle's vibrations. Namely, if the vibration-reduction control is applied as well while the amount of variation of the output torque is small, there arises a concern about an adverse effect.

Compensation torque setting unit 530 receives signals MDR(1), MDR(2) indicating respective operating states of motor generators MG1, MG2, as well as vibration-reduction torque Δtr0 calculated by vibration-reduction torque calculating unit 520. Compensation torque setting unit 530 selects a motor generator by means of which the vibration-reduction control is to be performed, based on respective operating states of motor generators MG1, MG2 that are indicated by signals MDR(1), MDR(2).

The operating state of each motor generator, based on which it is determined whether or not the vibration-reduction control is applicable, at least includes the control mode for the motor generator. Specifically, when the control mode is not the PWM control (or more specifically when the control mode is not the sine-wave PWM control), the vibration-reduction control by means of the motor generator is inhibited for the following reason. Namely, the torque control responsiveness is not high and therefore the vibration-reduction control cannot be performed effectively, which may result in a phase shift and disadvantageously promote vehicle's vibrations depending on the case.

Alternatively, the operating state of each motor generator, based on which it is determined whether or not the vibration-reduction control is applicable, may include at least one of the motor's temperature, rotational speed, torque, and output. For example, when the temperature of the motor generator is a high temperature state which is higher than a predetermined temperature, the vibration-reduction control by means of this motor generator is preferably inhibited for the following reason. Namely, addition of the vibration-reduction torque causes a torque larger than an intended output torque to be generated, which may cause a still higher temperature. When the rotational speed is in a high-speed range which is higher than a predetermined value as well, the vibration-reduction control by means of the motor generator is preferably inhibited for the following reason. Namely, addition of the vibration-reduction torque causes the rotational speed to further increase, which may result in an over-rotating state. Likewise, when the torque and/or the output (power) is in a high-output range which is larger than a predetermined value as well, preferably the vibration-reduction control by means of the motor generator is inhibited in order to avoid a further increase of the torque and/or output.

Compensation torque setting unit 530 basically performs the vibration-reduction control by means of motor generator MG2 which directly changes the rotational speed of drive wheels 39a, 39b. Therefore, when the vibration-reduction torque can be output by motor generator MG2, namely the vibration-reduction control can be performed by means of motor generator MG2, namely when none of the above-listed conditions for inhibiting the vibration-reduction control is met, compensation torque setting unit 530 selects motor generator MG2. At this time, compensation torque $\Delta tr(2)$ for motor generator MG2 is set to $\Delta tr0$ and compensation torque $\Delta tr(1)$ for motor generator MG1 is set to 0.

In contrast, when the vibration-reduction control by means of motor generator MG2 cannot be done, for example, when any of the conditions for inhibiting the vibration-reduction control is met such as the condition that the rectangular-wave voltage control is applied, compensation torque setting unit 530 selects the other motor generator, namely motor generator MG1 to perform the vibration-reduction control. At this time, compensation torque $\Delta tr(1)$ for motor generator MG1 is set to $\Delta tr0$ and compensation torque $\Delta tr(2)$ for motor generator MG2 is set to 0.

Between compensation torques $\Delta tr(1)$, $\Delta tr(2)$ and vibration-reduction torque $\Delta tr0$, a phase difference is defined as required for maximizing the vibration-reduction effect. For example, the required phase difference may be determined in advance by means of real equipment and experiment. Compensation torque setting unit 530 can perform, in addition to a proportional operation, the transfer function for which phase-advance compensation (or phase-delay compensation) is performed, to thereby calculate compensation torques $\Delta tr(1)$, $\Delta tr(2)$ from vibration-reduction torque $\Delta tr0$ and thus define the phase difference as described above.

In particular, the power transmission path from motor generator MG2 to drive shaft 32a and the power transmission path from motor generator MG1 to drive shaft 32a differ from each other in terms of the length of the path and the components. Accordingly, respective transfer functions for motor generators MG1, MG2 to act on the variations of the speed of drive shaft 32a (drive wheels 39a, 39b) also differ from each other. It is therefore preferable that compensation torque $\Delta tr(2)$ which is output from motor generator MG2 and compensation torque $\Delta tr(1)$ which is output from motor generator MG1 have a phase difference therebetween.

Addition unit 540 calculates torque command value Trqcom(1) for motor generator MG1 so that compensation torque $\Delta tr(1)$ for the vibration-reduction control is reflected. Torque command value Trqcom(1) is calculated by addition of the original torque command value Tr(1) for MG1 for generating the vehicle-driving force and compensation torque $\Delta tr(1)$ which is set by compensation torque setting unit 530.

Likewise, addition unit 550 calculates torque command value Trqcom(2) for motor generator MG2 so that compensation torque $\Delta tr(2)$ for vibration-reduction control is reflected. Torque command value Trqcom(2) is calculated by addition of the original torque command value Tr(2) for MG2 for generating the vehicle-driving force and compensation torque $\Delta tr(2)$ which is set by compensation torque setting unit 530.

Figure 7:
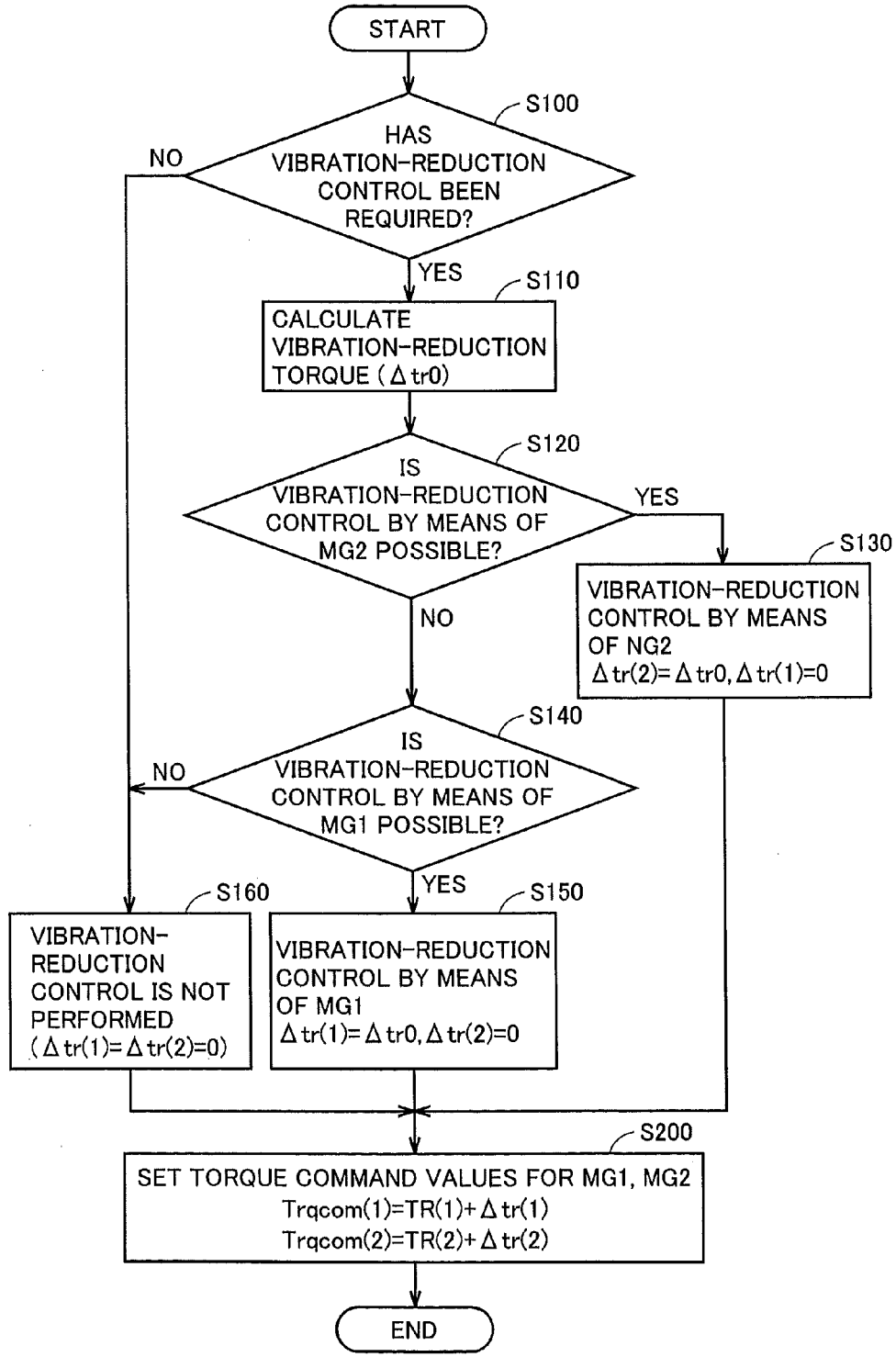
FIG. 7 is a flowchart for explaining a process procedure for the vibration-reduction control for the electrically-powered vehicle in an embodiment of the present invention.

FIG. 7 shows a flowchart for the vibration-reduction control performed by vibration-reduction control unit 500 shown in FIG. 6.

Referring to FIG. 7, motor ECU 45 determines in step S100 whether or not the vibration-reduction control is required. The determination in step S100 can be performed based on vibration-reduction control flag FNV shown in FIG. 6.

When the vibration-reduction control is required (YES in S100), motor ECU 45 proceeds to step S110 and calculates vibration-reduction torque $\Delta tr0$. The process in step S110 corresponds to the functions of rotational-speed variation extracting unit 510 and vibration-reduction torque calculating unit 520 shown in FIG. 6.

Further, motor ECU 45 determines in step S120 whether or not the vibration-reduction control can be performed by means of motor generator MG2. The determination in step S120 is made as described above based on the operating state of motor generator MG2. It is most simple and convenient that the determination in step S120 is made based on whether or not the PWM control (sine-wave PWM control) is applied to motor generator MG2.

When the vibration-reduction control by means of motor generator MG2 is possible (YES in S120), motor ECU 45 proceeds to step S130. In step S130, in order to perform the vibration-reduction control by means of MG2, compensation torque $\Delta tr(2)$ is set to $\Delta tr0$ and compensation torque $\Delta tr(1)$ is set to 0.

In contrast, when the vibration-reduction control by means of motor generator MG2 is impossible (NO in S120), motor ECU 45 proceeds to step S140 and further determines whether or not the vibration-reduction control by means of motor generator MG1 is possible. The determination in step S140 is made as described above based on the operating state, which may be the control mode, of motor generator MG1.

Respective conditions based on which the determinations are made in steps S120 and S140 may be identical to or different from each other.

When the vibration-reduction control by means of motor generator MG1 is possible (YES in S140), motor ECU 45 proceeds to step S150 and performs the vibration-reduction control by means of motor generator MG1. In step S150, in order to perform the vibration-reduction control by means of MG1, compensation torque $\Delta tr(1)$ is set to $\Delta tr0$ while compensation torque $\Delta tr(2)$ is set to 0.

When the vibration-reduction control is not required (NO in S100) or when both the vibration-reduction control by means of motor generator MG1 and that by means of motor generator MG2 cannot be done (NO in S120 and NO in S140), motor ECU 45 proceeds to step S160. In step S160, in order that the vibration-reduction control is not performed, the compensation torques are set as follows: $\Delta tr(1)=\Delta tr(2)=0$.

Further, motor ECU 45 sets in step S200 torque command values Trqcom(1), Trqcom(2) for motor generators MG1, MG2. They are set as follows: $Trqcom(1)=TR(1)+\Delta tr(1)$ and $Trqcom(2)=TR(2)+\Delta tr(2)$. Then, respective output torques of motor generators MG1, MG2 are controlled in accordance with torque command values Trqcom(1), Trqcom(2). Specifically, in accordance with feedback control for eliminating a torque difference, ON/OFF of the switching devices in inverters 41, 42 is controlled and accordingly the AC power to be supplied to motor generators MG1, MG2 is controlled.

As seen from the foregoing, in the electrically-powered vehicle of the present embodiment configured to be mounted with a plurality of vehicle-driving motor generators MG1, MG2, the vibration-reduction control can be performed by selecting one of the motor generators that operates in such a state that can output a vibration-reduction torque for reducing periodic variations in rotational speed of the drive shaft (drive wheels).

In particular, while a motor generator (MG2) having a higher vibration-reduction effect is preferentially used for the vibration-reduction control, a remaining motor generator (MG1) may be used for performing the vibration-reduction control if the former motor generator MG2 is operating in a state that cannot output the vibration-reduction torque.

Consequently, the vibration-reduction control can more reliably be performed as compared with the control under which the vibration-reduction control is performed by means of the same motor generator. Moreover, as compared with the control like that disclosed in PTL 1 and PTL 2 under which system voltage VH is boosted to enable the vibration-reduction control, a decrease in efficiency due to an increase of the switching loss of converter 40 does not occur. Accordingly, in the electrically-powered vehicle mounted with a plurality of vehicle-driving electric motors, the vibration-reduction control for reducing vehicle's vibrations based on the torque control of the electric motors can be performed appropriately and smoothly to thereby improve the driving comfort.

It should be noted that an example has been described in connection with FIGS. 5 and 6 that vibration-reduction torque $\Delta tr0$ is calculated so that variation component $\Delta MRN(2)$ of rotational speed MRN(2) of motor generator MG2 is cancelled out. However, the speed variation component to be reduced by the vibration-reduction control of the present embodiment is not limited to the above-described example, and any variation component may be detected in an arbitrary manner. For example, based on the detected value of an acceleration sensor (G sensor) or based on the stroke (crank angle) of the engine as disclosed in PTL 2, the speed variation component of the vehicle to be reduced may be extracted.

Moreover, while FIG. 1 illustrates the configuration where power split device 30 configured in the form of a planetary gear train is used to mechanically connect respective output shafts of engine 22 and motor generators MG1 and MG2, it is noted for the sake of confirmation that the application of the present invention is not limited to such a configuration. As long as the vehicle is a hybrid vehicle having its drive system configured to have a plurality of vehicle-driving electric motors (motor generators), the vibration-reduction control described in connection with the present embodiment is applicable.

Modification of Vibration-Reduction Control

According to the flowchart shown in FIG. 7, the vibration-reduction control is not performed (S160) when none of motor generators MG1, MG2 can output the vibration-reduction torque. In the following, a description will be given of a modification of the vibration-reduction control that enables the vibration-reduction torque to be generated even under the above-described situation.

Figure 8:
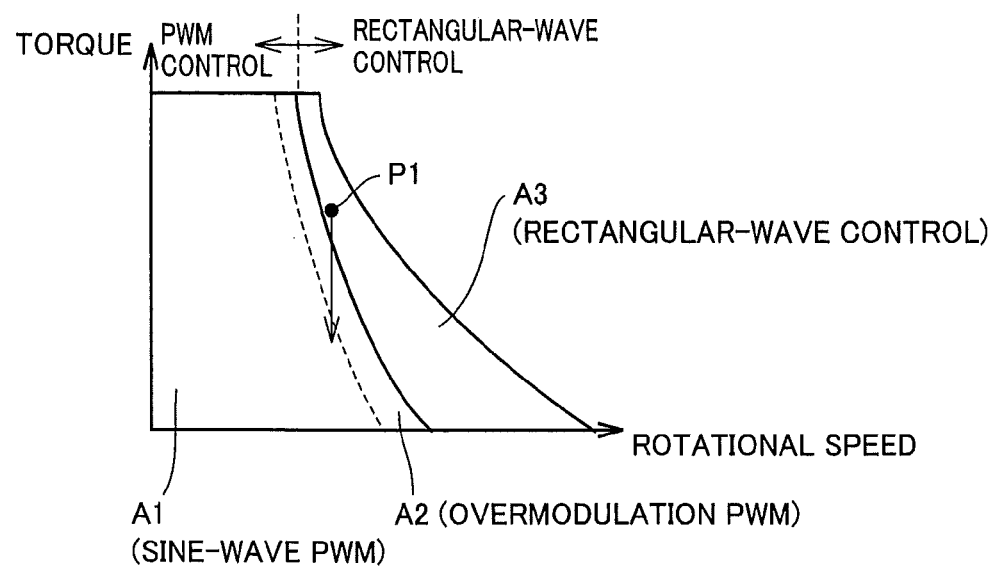
FIG. 8 is a schematic diagram for generally explaining a relationship between a change of the operating range of a motor generator and a change of the control mode.

Here, FIG. 8 is used to explain a relationship between a change of the operating range of a motor generator and a change of the control mode.

Referring to FIG. 8, it is supposed that motor generator MG2 is currently operating at an operating point P1 and the control mode is the rectangular-wave voltage control. Under this condition, if motor generator MG1 is also operating in the state that makes it impossible to perform the vibration-reduction control, the vibration-reduction control cannot be performed as described above.

Meanwhile, hybrid vehicle 20 can also use engine 22 to generate the vehicle-driving force. Therefore, the ratio between a share of the required power of the whole vehicle to be generated by the engine and a share thereof to be generated by the motor generator can be changed to thereby reduce the output torque of motor generator MG2. In this case, the operating point shifts downward from P1 in FIG. 8 and therefore the output of motor generator MG2 decreases.

Consequently, the amplitude of the voltage applied from inverter 42 to motor generator MG2 also decreases. Thus, the required modulation ratio decreases to thereby make the PWM control (preferably sine-wave PWM control) applicable. Accordingly, while the driving force for the whole vehicle is kept constant, the vibration-reduction control can be performed.

Figure 9:
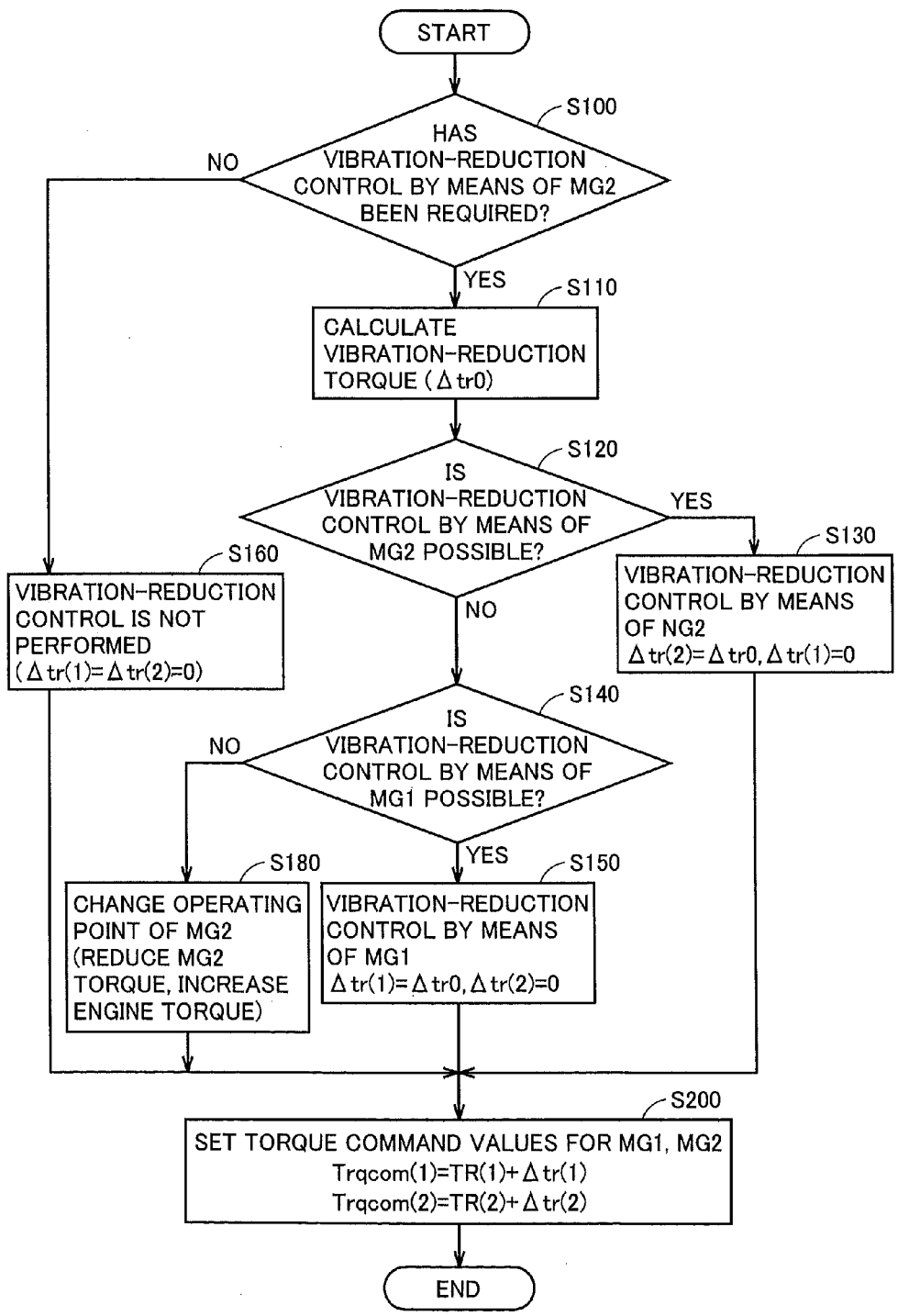
FIG. 9 is a flowchart for explaining a modification of the vibration-reduction control for the electrically-powered vehicle in an embodiment of the present invention.

FIG. 9 shows a flowchart for explaining the modification of the vibration-reduction control for the electrically-powered vehicle in the embodiment of the present invention.

Referring to FIG. 9, under the vibration-reduction control in the modification of the present embodiment, motor ECU 45 further performs step S180 in addition to steps S100 to S160 shown in FIG. 9.

Step S180 is performed when both the vibration-reduction control by means of motor generator MG1 and the vibration-reduction control by means of motor generator MG2 are impossible (NO in step S120 and NO in step S140). In contrast, step S160 in which the vibration-reduction control is not performed is executed only when the determination in step S100 is NO.

In step S180, motor ECU 45 changes the operating point of motor generator MG2 as described above with reference to FIG. 8. For example, the operating point is changed so that the output of engine 22 is increased and the output torque of motor generator MG2 is decreased. At this time, the increment of the output of engine 22 is determined so that this increment corresponds to the decrement of the torque of motor generator MG2 to thereby keep constant the driving force for the whole vehicle.

Such a change of the operating point causes the output of motor generator MG2 to decrease. Accordingly, the control mode is changed to the PWM control to thereby enable the vibration-reduction control by means of motor generator MG2. Thus, under the vibration-reduction control in the modification of the present embodiment, the vibration-reduction control can be performed by changing the operating point of motor generator MG2 even if both motor generators MG1 and MG2 are in respective operating states that do not enable the vibration-reduction control.

Although not shown in FIG. 9, when the vibration-reduction control by means of motor generator MG2 is inhibited due to a condition (such as high temperature) other than the control mode, this condition may also disable the vibration-reduction control by means of motor generator MG2 even if the operating point is changed to allow the control mode to change to the PWM control. It is therefore preferable, when the determination in step S120 is NO due to a condition other than the control mode, to perform step S160 in which the vibration-reduction control is not performed, instead of step S180 in which the operating point is changed.

Modification of Electrically-Powered Vehicle

Figure 10:
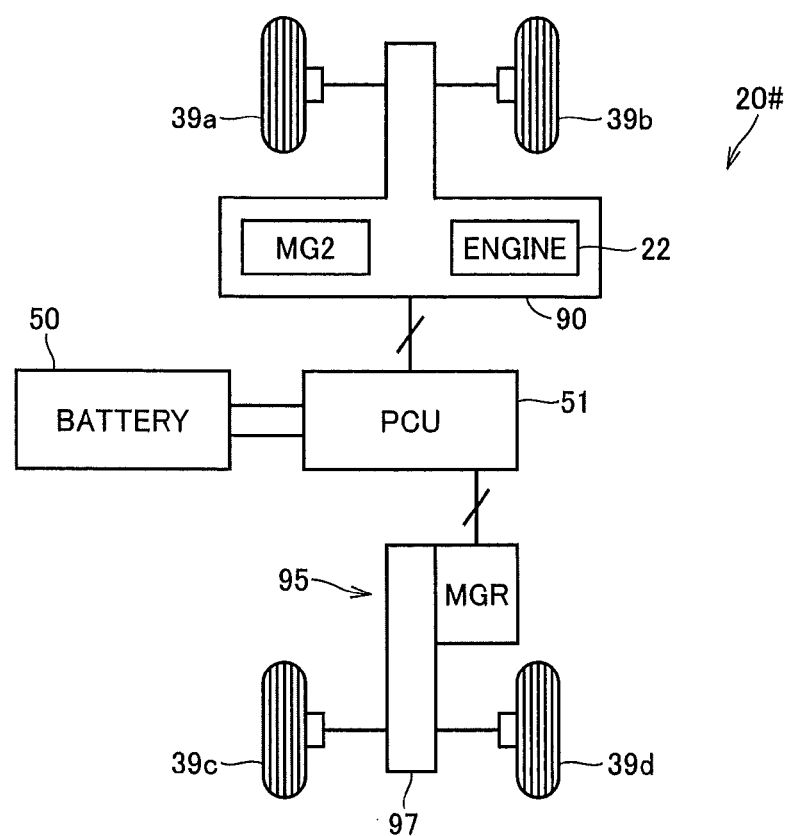
FIG. 10 is a configuration diagram for explaining a modification of the configuration of the electrically-powered vehicle in an embodiment of the present invention.

FIG. 10 shows a modification of the configuration of the electrically-powered vehicle in the embodiment of the present invention.

Referring to FIG. 10, a hybrid vehicle 20# of the modification in the embodiment of the present invention includes a drive unit 90 for driving front wheels 39a, 39b and a drive unit 95 for driving rear wheels 39c, 39d. Hybrid vehicle 20# is a so-called four-wheel drive vehicle in which both front wheels 39a, 39b and rear wheels 39c, 39d are the drive wheels. In the example configuration of FIG. 10, rear wheels 39c, 39d correspond to "sub drive wheels" and front wheels 39a, 39b correspond to "main drive wheels."

Hybrid vehicle 20# further includes a battery 50 and an electric power control unit (PCU) 51. PCU 51 represents a group of devices for electric power conversion between battery 50 and vehicle-driving electric motors (MG1, MG2, MGR), and the aforementioned devices are typically converter 40 and inverters 41, 42 shown in FIGS. 1 and 2.

Drive unit 90 has a configuration similar for example to the power train in FIG. 1. Namely, motor generators MG1, MG2 and engine 22 are operated so that they cooperate with each other to generate the driving force for drive wheels 39a, 39b. Alternatively, drive unit 90 may be configured in the form of the so-called parallel hybrid system, by removing, from the configuration of FIG. 1, motor generator MG1 that enables electric power to be generated from the engine power, so that engine 22 and motor generator MG2 operate in parallel to generate the vehicle-driving force. Drive unit 90 may also be configured in the form of the so-called series hybrid system in which drive unit 90 uses the output of engine 22 solely for generating electric power.

Drive unit 95 includes a motor generator MGR for driving the rear wheels and a speed reducer 97 disposed between respective drive shafts (not shown) of the rear wheels. Like motor generator MG2, motor generator MGR is driven by PCU 51 using the electric power fed from battery 50. Instead, the electric power generated through regenerative power generation by motor generator MGR can be used to charge battery 50 through PCU 51.

Drive units 90, 95 may be configured in any manner as long as they are configured so that a plurality of vehicle-driving electric motors (motor generators) are mounted on the vehicle as a whole.

Hybrid vehicle 20# having the configuration shown in FIG. 10 is also mounted, like hybrid vehicle 20, with a plurality of vehicle-driving electric motors (MG1, MG2, MGR/MG2, MGR). Thus, while motor generator MG2 which generates the driving force for the main drive wheels is preferentially used to perform the vibration-reduction control, motor generator MGR which generates the driving force for the sub drive wheels can also be used to perform the vibration-reduction control if motor generator MG2 is in its operating state that disables the vibration-reduction control. For example, a periodic torque corresponding to compensation torque $\Delta tr(1)$ for hybrid vehicle 20 can be added to the torque command value for motor generator MGR to thereby implement the vibration-reduction control by means of motor generator MGR.

In other words, in applications of the present invention, a plurality of vehicle-driving electric motors (motor generators) mounted on the electrically-powered vehicle may be candidates by means of which the vibration-reduction control is to be performed, and these candidates are not limited to electric motors for generating the driving force for the same drive wheels. In the example configuration of FIG. 10, motor generator MGR corresponds to "first electric motor" and motor generator MG2 corresponds to "second electric motor."

It should be noted that rear wheels 39c, 39d may be main drive wheels and front wheels 39a, 39b may be sub drive wheels. In this case, an electric motor (motor generator) for generating the driving force for the rear wheels corresponds to "second electric motor" and an electric motor (motor generator) for generating the driving force for the front wheels corresponds to "first electric motor."

In addition, although FIGS. 1 and 10 show hybrid vehicles 20 and 20# as typical examples of the electrically-powered vehicle, the electric vehicle or fuel cell vehicle in which only the electric motor serves as a source for supplying the vehicle-driving force and no engine 22 is disposed, namely generally all kinds of electrically-powered vehicles, can undergo the vibration-reduction control similar to that of the present embodiment as long as the electrically-powered vehicle is mounted with a plurality of vehicle-driving electric motors (motor generators).

It should be construed that embodiments disclosed herein are by way of illustration in all respects, not by way of limitation. It is intended that the scope of the present invention is defined by claims, not by the above description, and encompasses all modifications and variations equivalent in meaning and scope to the claims.

INDUSTRIAL APPLICABILITY

The present invention is applicable to an electrically-powered vehicle mounted with a plurality of vehicle-driving electric motors.

REFERENCE SIGNS LIST 20, 20# hybrid vehicle; 22 engine; 24 engine ECU; 23 crank angle sensor; 26 crankshaft; 28 torsional damper; 30 power split device; 31, 65 sun gear; 31a sun gear shaft; 32, 66 ring gear; 32a ring gear shaft (drive shaft); 33, 67 pinion gear; 34 carrier; 37 gear mechanism; 38 differential gear; 39a, 39b front wheel (first drive wheel); 39c, 39d rear wheel (second drive wheel); 40 converter; 41, 42 inverter; 43, 44 rotational position detection sensor; 45 motor ECU; 48 output shaft; 50 battery; 52 battery ECU; 54 electric power line; 60 transmission; 61 case; 80 ignition switch; 81 shift lever; 82 shift position sensor; 83 accelerator pedal; 84 accelerator pedal position sensor; 85 brake pedal; 86 brake pedal position sensor; 88 vehicle speed sensor; 90, 95 drive unit; 97 speed reducer; 112, 122 neutral point; 180 voltage sensor; 500 vibration-reduction control unit; 510 rotational-speed variation extracting unit; 520 torque calculating unit; 530 compensation torque setting unit; 540, 550 addition unit; Acc accelerator pedal position; BP brake pedal position; FNV vibration-reduction control flag; MDR(1), MDR(2) signal (motor's operating state); MG1, MG2, MGR motor generator; MRN rotational speed; ΔMRN speed variation component; Δtr0 vibration-reduction torque; Δtr(1), Δtr(2) compensation torque (vibration-reduction control); P1 operating point; Tr(1), Tr(2) torque command value (vehicle-driving force); Trqcom(1), Trqcom(2) torque command value (final); VH DC voltage (system voltage).

The invention claimed is:

1. An electrically-powered vehicle comprising:
 a plurality of electric motors for generating a vehicle-driving force;
 a control device for controlling said plurality of electric motors; and
 an internal combustion engine, wherein
 said plurality of electric motors include:
 a first electric motor disposed on a power transmission path extending from said internal combustion engine to a drive wheel through a drive shaft; and
 a second electric motor mechanically connected to said drive shaft,
 said control device is configured to perform vibration-reduction control for reducing a periodic speed variation of the vehicle by: selecting, from said plurality of electric motors, an electric motor for use in performing said vibration-reduction control, depending on an operating state of said plurality of electric motors each; and selectively adding to an output torque of the selected electric motor among said plurality of electric motors, a compensation torque corresponding to a periodic vibration-reduction torque component for cancelling out a periodic speed variation component of the vehicle, and
 said control device performs said vibration-reduction control using said second electric motor when the operating state of said second electric motor is a state that allows said vibration-reduction control to be performed, and performs said vibration-reduction control using said first electric motor when the operating state of said second electric motor is not the state that allows said vibration-reduction control to be performed.

2. The electrically-powered vehicle according to claim 1, wherein
 said operating state includes a control mode for said electric motors each,
 said control mode includes a first control mode to which pulse width modulation control is applied and a second control mode to which rectangular-wave voltage control is applied, and
 said control device performs said vibration-reduction control by selecting from said plurality of electric motors an electric motor to which said first control mode is applied.

3. The electrically-powered vehicle according to claim 1, wherein
 said operating state includes at least one of a temperature, a rotational speed, a torque, and an output of said electric motors each, and
 said control device inhibits said vibration-reduction control which uses an electric motor where said at least one of said temperature, said rotational speed, said torque, and said output is higher than a predetermined value, among said plurality of electric motors.

4. The electrically-powered vehicle according to claim 1, wherein
 said operating state includes a control mode for said electric motors each,
 said control mode includes a first control mode to which pulse width modulation control is applied and a second control mode to which rectangular-wave voltage control is applied, and
 when said first control mode is applied to said second electric motor, said control device performs said vibration-reduction control using said second electric motor and, when said first control mode is applied to none of said first and second electric motors, said control device causes a decrease of an output of said second electric motor and causes an increase of an output of at least one of said internal combustion engine and said first electric motor, so that said increase corresponds to an amount of said decrease of the output.

5. The electrically-powered vehicle according to claim 1, further comprising a differential device including first to third rotational elements capable of rotating relative to each other, wherein
 said first rotational element is mechanically connected to an output shaft of said internal combustion engine,
 said second rotational element is mechanically connected to an output shaft of said first electric motor, and
 said third rotational element is mechanically connected to said drive shaft and an output shaft of said second electric motor.

6. The electrically-powered vehicle according to claim 1, wherein
 when said control device performs said vibration-reduction control, said control device calculates a vibration-reduction torque component of a phase opposite to said speed variation component and adds a compensation torque corresponding to said vibration-reduction torque component, to an output torque of the electric motor used in performing said vibration-reduction control, and
 said compensation torque when said vibration-reduction control is performed using said first electric motor and said compensation torque when said vibration-reduction control is performed using said second electric motor differ from each other in terms of phase relative to said vibration-reduction torque component.

7. A method for controlling an electrically-powered vehicle including a plurality of electric motors for generating a vehicle-driving force and an internal combustion engine, comprising the steps of:
 selecting, from said plurality of electric motors, an electric motor for use in performing vibration-reduction control, depending on an operating state of said plurality of electric motors each; and
 selectively adding to an output torque of the electric motor for use in performing said vibration-reduction control among said plurality of electric motors, a compensation torque corresponding to a vibration-reduction torque component for cancelling out a periodic speed variation component of the vehicle, wherein
 said plurality of electric motors include:
 a first electric motor disposed on a power transmission path extending from said internal combustion engine to a drive wheel through a drive shaft; and
 a second electric motor mechanically connected to said drive shaft, and
 said step of selecting performs said vibration-reduction control using said second electric motor when the operating state of said second electric motor is a state that allows said vibration-reduction control to be performed, and performs said vibration-reduction control using said first electric motor when the operating state of said second electric motor is not the state that allows said vibration-reduction control to be performed.

8. The method for controlling an electrically-powered vehicle according to claim 7, wherein
said operating state includes a control mode for said electric motors each,
said control mode includes a first control mode to which pulse width modulation control is applied and a second control mode to which rectangular-wave voltage control is applied, and
said step of selecting performs said vibration-reduction control using, among said plurality of electric motors, an electric motor to which said first control mode is applied.

9. The method for controlling an electrically-powered vehicle according to claim 7, wherein
said operating state includes at least one of a temperature, a rotational speed, a torque, and an output of said electric motors each, and
said step of selecting inhibits said vibration-reduction control which uses an electric motor where said at least one of said temperature, said rotational speed, said torque, and said output is higher than a predetermined value, among said plurality of electric motors.

10. The method for controlling an electrically-powered vehicle according to claim 9, wherein
said operating state includes a control mode for said electric motors each,
said control mode includes a first control mode to which pulse width modulation control is applied and a second control mode to which rectangular-wave voltage control is applied,
said step of selecting includes the steps of:
  performing said vibration-reduction control using said second electric motor when said first control mode is applied to said second electric motor; and
  performing said vibration-reduction control using said first electric motor when said first control mode is not applied to said second electric motor and said first control mode is applied to said first electric motor, and
said method for controlling an electrically-powered vehicle further comprises the step of causing a decrease of an output of said second electric motor and causing an increase of an output of at least one of said internal combustion engine and said first electric motor, so that said increase corresponds to an amount of said decrease of the output, when said first control mode is applied to none of said first and second electric motors.

11. The method for controlling an electrically-powered vehicle according to claim 7, wherein said compensation torque when said vibration-reduction control is performed using said first electric motor and said compensation torque when said vibration-reduction control is performed using said second electric motor differ from each other in terms of phase relative to said vibration-reduction torque component.

12. The electrically-powered vehicle according to claim 1, wherein said speed variation component is speed information common to said plurality of electric motors.

13. The method for controlling an electrically-powered vehicle according to claim 7, wherein said speed variation component is speed information common to said plurality of electric motors.

* * * * *